United States Patent
Schopp

[11] 3,730,099
[45] May 1, 1973

[54] CONTROLLED DESCENT SYSTEM
[75] Inventor: Lloyd W. Schopp, Akron, Ohio
[73] Assignee: The United States of America as represented by the Secretary of the Navy
[22] Filed: Dec. 17, 1970
[21] Appl. No.: 99,185

[52] U.S. Cl. ............... 102/35.6, 244/138, 244/147, 102/34.1
[51] Int. Cl. ................... F42b 15/12, F42b 25/02
[58] Field of Search ............... 102/34, 35, 35.6, 102/34.1; 244/138, 147, 148, 149, 150, 1 R

[56] References Cited

UNITED STATES PATENTS

| | | | |
|---|---|---|---|
| 2,317,256 | 4/1943 | De Kurowski | 102/35 |
| 2,798,683 | 7/1957 | Swenson | 244/149 |
| 3,502,023 | 3/1970 | Britton | 102/35.6 |
| 3,141,640 | 7/1964 | Sutliff et al. | 244/138 R |
| 2,759,693 | 8/1956 | Gross | 244/138 R |
| 3,550,885 | 8/1968 | Crabtree | 102/35 |
| 3,038,407 | 6/1962 | Robertson | 244/150 |

Primary Examiner—Benjamin A. Borchelt
Assistant Examiner—J. V. Doramus
Attorney—R. S. Sciascia and Henry Hansen

[57] ABSTRACT

A descent retarding system for an airdropped store is provided by a multistage canister allowing timed, sequential deployment of a parachute and parawing. Following ejection of the store, split half rings and a cover are removed from one end for deployment of a deceleration parachute. After a delay provided by a mechanical or pyrotechnic timer, a retaining member is removed from a parawing compartment allowing resilient, longitudinal finger-like sections of the compartment housing to spring outwardly allowing rapid deployment of an accordion-folded parawing. The parachute is jettisoned once the parawing has inflated.

5 Claims, 13 Drawing Figures

Patented May 1, 1973 3,730,099

INVENTOR.
LLOYD W. SCHOPP

BY

*[signature]*

ATTORNEY

Patented May 1, 1973
3,730,099
3 Sheets-Sheet 2
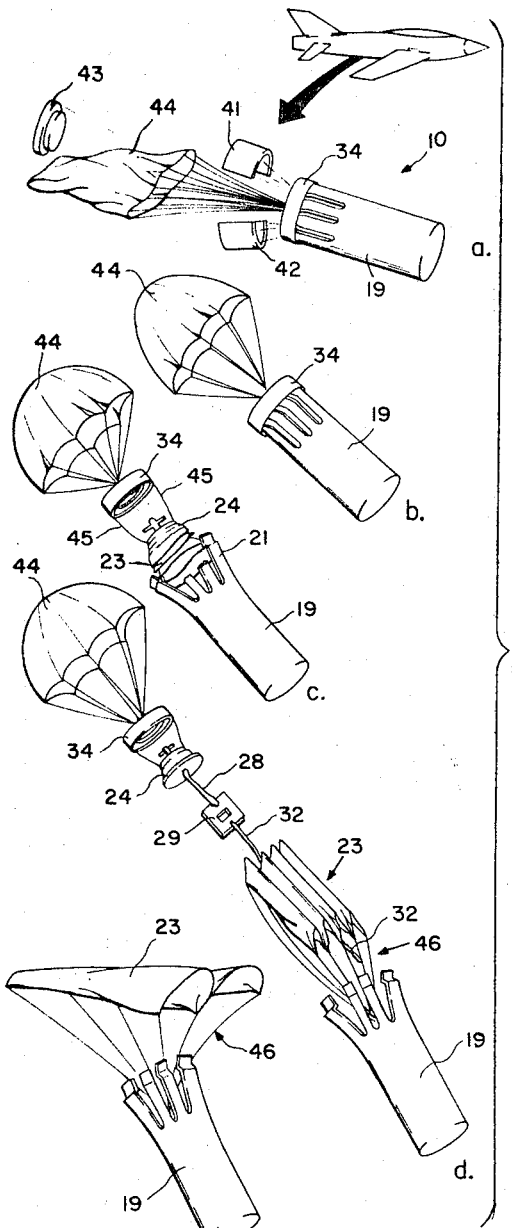
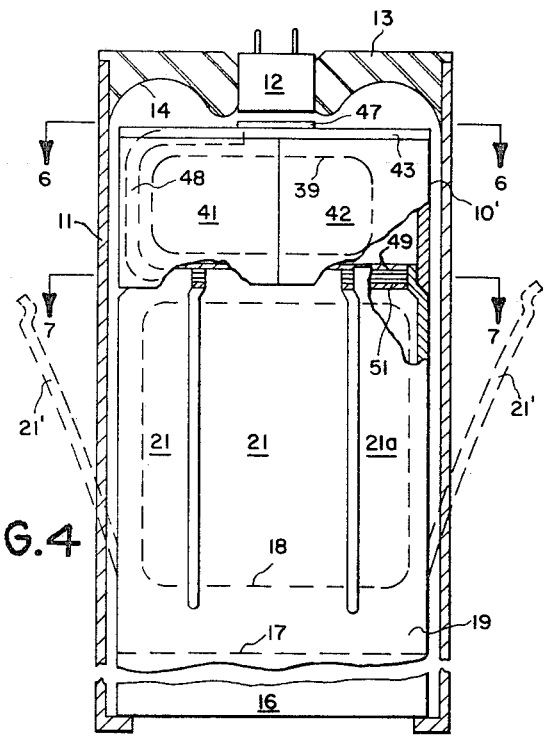
FIG. 4
FIG. 5
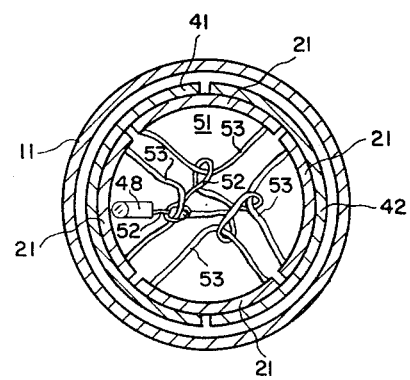
FIG. 7
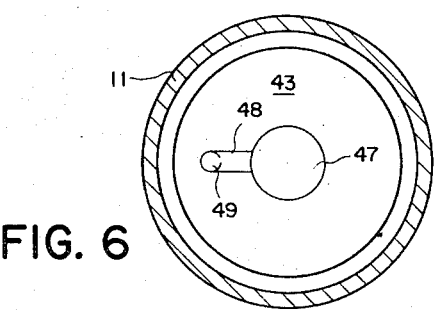
FIG. 6
INVENTOR.
LLOYD W. SCHOPP
BY
[signature]
ATTORNEY Patented May 1, 1973

INVENTOR.
LLOYD W. SCHOPP

BY

*ATTORNEY*

CONTROLLED DESCENT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates in general to novel descent retarding systems, and more particularly, to apparatus for timed multistage deployment of aerodynamic decelerators.

In a descent retarding system of a given total weight, the lower the terminal descent rate required to keep a store airborne, the larger the aerodynamic decelerator must be. For example, a 12 ounce payload dispensed at 3,000 feet altitude will stay aloft for 15 minutes if it has an average rate of descent of 200 feet per minute, roughly one seventh the speed of normal descent systems, such as a man descending by parachute. To achieve the descent rate of 200 fpm, a conventional parachute would have to be approximately ten feet in diameter. It can be shown that exposing a parachute of this size to an air stream it approximately mach 1 would result in a loading of from 1,000 to 10,000 G's. To withstand such force very heavy gauge materials would be necessary. The increased system weight, however, would drastically change the postulated final descent speed. Where system volume and weight are critical, the apparent dilemma in an extremely high initial deceleration and a low speed final descent has been left unresolved by prior art aerodynamic decelerators.

SUMMARY OF THE INVENTION

Accordingly, one of the objects of the invention is to decelerate by aerodynamic means an ejected store traveling at approximately the speed of sound. Another object of the invention is to cause an airdropped instrument package or payload to decelerate quickly from high speed to a slow terminal descent. A further object of the invention is to deploy in sequence two aerodynamic decelerators to maintain a small store airborne for the longest possible time.

These and other objects are achieved by employing a multistage descent system for an airdropped store using two separate aerodynamic decelerators in sequence. Following ejection from an aircraft, a deceleration parachute is deployed by the air stream initiating a timing mechanism. A parawing is packed in a compartment adjacent to the payload having outwardly sprung fingers forming a cylindrical housing. After a predetermined delay, the timing mechanism releases the retaining member allowing the compartment to spring open deploying the parawing and detaching the parachute.

BRIEF DESCRIPTION OF THE DRAWING

FIG. 4 is a perspective view showing the sequence of deployment for the embodiment of FIG. 1;

FIG. 5 is a side view of an alternate embodiment of the invention with portions in cross section and portions broken away;

FIG. 6 is a cross-sectional view in plan taken along lines 6—6 of FIG. 5;

FIG. 7 is a cross-sectional view in plan taken along the lines 7—7 of FIG. 5;

DESCRIPTION OF THE PREFERRED EMBODIMENTS

Figure 1:
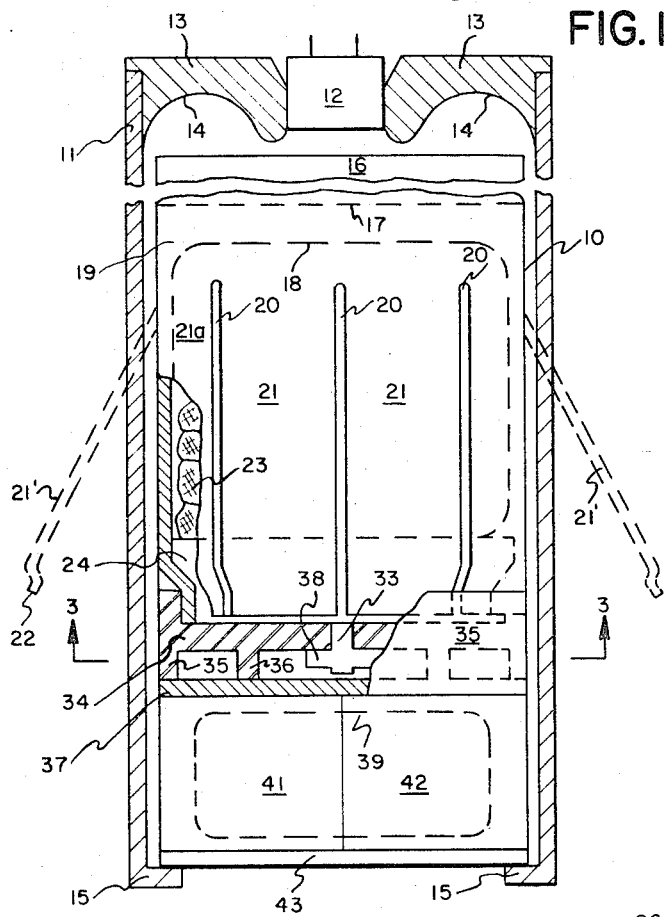
FIG. 1 is a side view of an embodiment of the invention loaded into a dispensing tube with portions in cross section and portions broken away.

A canister 10 is shown (in FIG. 1) in the stored condition in a dispensing tube 11 aboard an aircraft (not shown) before ejection. At the closed end of the tube 11, an electrically activated gas generator 12 is centrally carried within an annular base member 13 having a concave, annular inner wall 14 surrounding generator 12. The open end of dispensing tube 11 has perpendicular projections 15 forming breakable retaining lugs. Projections 15 may comprise single or plural fingers or a continuous lip. Canister 10 fits within dispensing tube 11 in sealing, slidable engagement therewith, similar to a piston in a cylinder. When pressurized gas is introduced by generator 12 into the space at the closed end of dispensing tube 11, canister 10 is forced toward the open end of tube 11 breaking off projections 15 allowing ejection from tube 11.

At the end of canister 10 adjacent to generator 12, a payload compartment or instrument package is located generally at 16 above the dashed line 17. The continuity of compartment area 16 is broken to indicate that any suitable volume can be accommodated for the payload. Normally the payload area will assume at least one third of the total volume of the canister 10 and will be the heaviest portion thereof. Therefore, the center of gravity of the entire canister 10 will ordinarily lie above line 17 somewhere within the area 16. A storage area for a parawing 23 is indicated generally by the area enclosed by dashed line 18. A split container 19 encloses payload compartment 16 and parawing compartment 18. A set of longitudinal slits 20 in container 19 separates a plurality of resilient fingers 21 urged outwardly to a relaxed position, shown by dashed lines 21', to form a flared opening when not constrained. The end of each finger has an inwardly bent end portion 22 presenting a jogging profile such that when fingers 21 are held together, the open end of container 19 has a slightly reduced diameter. Finger 21a is broken away to show a cross section thereof and folded parawing 23. Below parawing compartment 18 is a timing mechanism located in timer body 24 having a lateral surface conforming to end portion 22 of fingers 21 such that fingers 21 overlap and retain timer body 24 preventing downward displacement thereof.

Figure 2A:
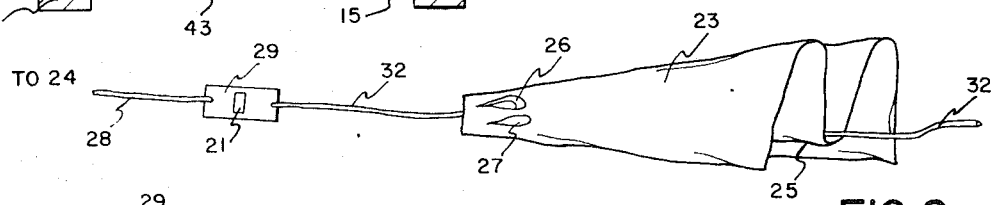
FIGS. 2a–2d are perspective views illustrating a method of folding the parawing of FIG. 1 for storage.
Figure 2B:
Figure 2C:
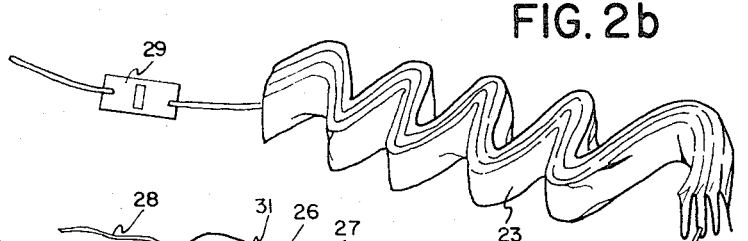
Figure 2D:
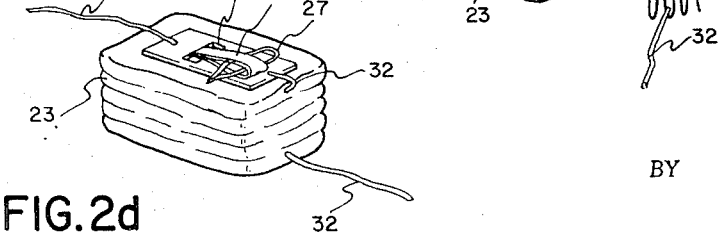

Referring now to FIG. 2a, parawing 23 is of conventional design having a generally delta wing appearance with a flexible longitudinal keel 25 dividing the wing into two rounded longitudinal portions when inflated. At the forward end of parawing 23, a fabric band 26 and a thread loop 27 are located. A string 28 is attached at one end to timer body 24 and at the other end to a retraction tab 29 having a central slot 31. A second string 32 is laid along the inside of parawing keel 25 with the loose end extending slightly beyond parawing 23 and the other end attached to retraction tab 29. Prior to storing in canister 10, the parawing is folded in an accordion fashion along its longitudinal axis as shown in FIG. 2b. Following this operation the parawing is accordion-folded in the transverse direction as shown in FIG. 2c resulting in a folded package illustrated in FIG. 2d with band 26 and loop 27 accessibly located on the top fold. Band 26 is inserted through slot 31 of tab 29. Loop 27 is then passed through band 26 to prevent band 26 from pulling out of slot 31 until a predetermined tension develops in string 28. The function of retraction tab 29 is to pull parawing 23 out of compartment 18 forward end first. As retraction tab 29 disengages from band 26, string 32 which has been interfolded with parawing 23 is pulled out of the folded package by tab 29.

Figure 3:
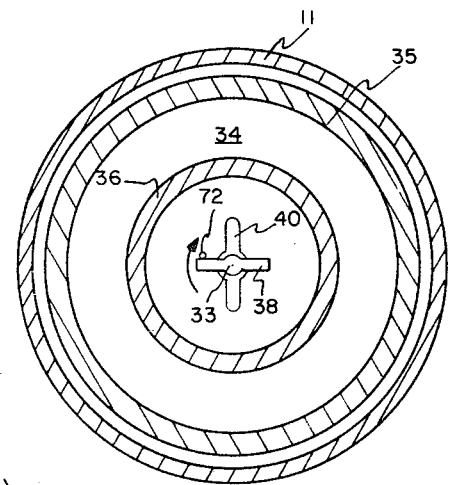
FIG. 3 is a cross-sectional view in plan taken along lines 3—3 of FIG. 1.

Referring again to FIG. 1, a rotatable vertical shaft 33 extends downwardly from timer body 24 and is driven by a suitable drive means such as a mechanical watch-spring type motor located in timer body 24. Shaft 33 extends through a retaining plate 34 in the general shape of a disc having an outer lip ring portion 35 which fits over and retains end portions 22 of fingers 21 thereby keeping casing 19 in a cylindrical form. A ring portion 36 of smaller diameter on the lower side of plate 34 supports a spacer disc 37 bonded or secured by other suitable means to plate 34. In the central space between disc 37 and plate 34, shaft 33 has a transverse key member 38 upon which plate 34 may rest as shown in FIG. 3. Eventually rotation of shaft 33 causes key member 38 to register with an elongated slot 40 formed in plate 34. Plate 34 separates from timer body 24 when key member 38 pulls completely through slot 40. A removable pin 72 located in a bore in plate 34 normally blocks key member 38 preventing rotation of shaft 33 and separation of plate 34 from timer body 24.

A parachute compartment is located just below spacer disc 37 indicated generally by the area enclosed by dashed line 39. The sides of the parachute compartment are enclosed by a pair of semicircular half rings 41 and 42 covered at the lower end of canister 10 by a plate 43.

Referring now to FIG. 4, stage a depicts canister 10 immediately after ejection. Cover plate 43 is removed by the high speed air stream. Half rings 41 and 42 separate permitting deployment of a parachute 44 formerly stored in area 39 (FIG. 1). The support lines for parachute 44 are secured to disc 37 (FIG. 1). An aperture (not shown) in disc 37 gives access to pin 72. When parachute 44 is stored, one or more of its support lines may be passed through the aperture in disc 37 to catch an appropriate hook end portion (not shown) of pin 72. Thus during deployment and inflation of parachute 44 to the condition shown in FIG. 4 stage b, pin 72 is extracted initiating slow rotation of key member 38. After a predetermined delay key member 38 will line up with slot 40 (FIG. 3) allowing retaining plate 34 and disc 37 to separate from the timer body 24 releasing fingers 21 which spring outwardly to their relaxed position. In stage c, as the end of container 19 begins to flare outwardly, timer body 24 is released and pulled out of the canister by means of strings 45 connecting plate 34 with timer body 24 at an appropriately spaced distance. With container 19 in the fully open position, parawing 23, packed in accordance with FIG. 2d, may be deployed. Stage d depicts this operation after retraction tab 29 has pulled free of band 26 and loop 27, parawing lines 46 having become more taut. In addition the tension on line 32 has caused parawing 23 to unfold transversely. Thus stage d depicts the configuration immediately before parachute 44 pulls line 32, tab 29, timer body 24 and retaining plate 34 away from the parawing and container 19. In stage e the parawing, having released its longitudinal accordion folds, is in the fully inflated position and the terminal descent has begun.

Canister 10 is designed to be ejected at high velocities on the order of mach 1. Since one of the objects of the system is to obtain a slow terminal descent, a relatively large aerodynamic decelerator is required, in this case a parawing, for the final or terminal configuration. Since the original loading at high speeds would be extremely high for such a large decelerator, a relatively small initial parachute is employed as shown in FIG. 4, stage b. For example, for a 12 ounce payload parachute 44 should have about a 4½ inch diameter to decrease the dynamic pressure to around 10 pounds per square foot before deployment of the parawing. Because of the small size, the material requirements for parachute 44 approach minimum gage standard parachute materials. The keel length of parawing 23 is about one-third of the diameter that an equivalent parachute, used in place of parawing 23, would have to have to obtain the same descent velocity. Since the parawing has lift as well as drag, a horizontal velocity component is produced which accounts for the smaller relative size of the parawing. Parawing 23 may be constructed of any suitable lightweight, minimum gage film. Parawing support lines 46 are connected in the conventional manner to the sides of the wing and the keel. Lines 46 may be attached to the top of the payload compartment, indicated by dashed line 17 in FIG. 1, inside of container 19.

An alternate embodiment 10′ of canister 10 in FIG. 1 is illustrated in FIG. 5. Canister 10′ is loaded into dispensing tube 11 in the reverse fashion with payload compartment 16 at the lower open end of tube 11. Other than the orientation, the basic change in FIG. 5 is that retaining plate 34 and timer 24 are replaced by a pyrotechnic fuse which is used to tie together the ends of fingers 21 on container 19. Referring now to FIG. 6, the end of canister 10′ adjacent generator 12 carries a pad 47 of pyrotechnic material having a suitable ignition temperature. Gas generator 12 ignites pad 47 during ejection of canister 10′ from tube 11. Pad 47 in turn ignites a pyrotechnic fuse 48 which extends through a hole 49 in cover plate 43 downwardly along the inner edge of half ring 41 and terminates below a separator disc 49 forming the bottom of parachute compartment 39. Referring now to FIG. 7 which is a top view of a plate 51 secured to disc 49 by a suitable spacer (not shown), pyrotechnic fuse 48 terminates in a quick burning fuse 52 which ties together loops 53 attached to the ends of respective fingers 21. When fuse 52 burns out, the mechanical connection between loops 53 is destroyed and resilient fingers 21 spring outwardly to the relaxed position indicated by fingers 21' in FIG. 5. The operational sequence is the same as that in FIG. 4 except that retaining ring 34 and timer 24 in FIG. 4 will be replaced by plates 49 and 51 for the apparatus of FIG. 5.

Figure 8:
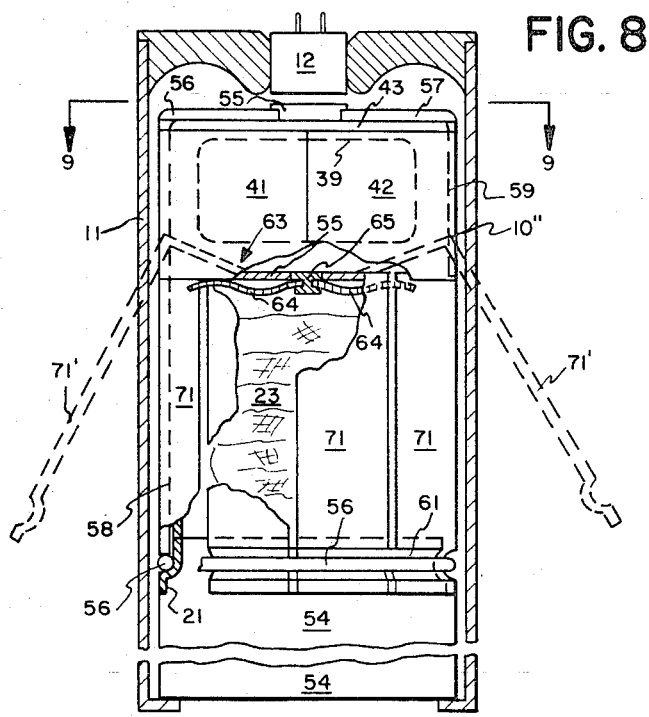
FIG. 8 is a side view of another embodiment of the invention with portions in cross section and portions broken away.
Figure 9:
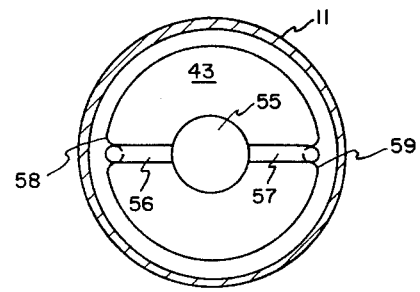
FIG. 9 is a cross-sectional view in plan taken along lines 9—9 of FIG. 8.

Another alternate embodiment shown in FIG. 8 has a canister 10" oriented within dispensing tube 11 in a similar manner to that of canister 10' of FIG. 5. A payload container 54 is located at the end of canister 10" adjacent the open end of tube 11. In this embodiment each L-shaped finger 71 is hinged at a corresponding point 63 on a plate 55 forming the bottom of parachute compartment 39. The material forming plate 55 and fingers 71 may be the same and may be weakened along appropriate lines for hinging fingers 71. This arrangement differs from the embodiment of FIG. 5 and FIG. 1 in that fingers 71 are not a part of the payload container in the final configuration. Referring to FIG. 9 wherein the cover plate 43 is viewed from above, a pad 55 of pyrotechnic material is located opposite gas generator 12. Two lead encased pyrotechnic fuses 56 and 57 extend radially in opposite directions from pad 55 along the top of cover plate 43. Fuse 56 continues vertically downward along the side of canister 10" in a groove 58 terminating just below the top of payload compartment 54. Likewise, fuse 57 continues downwardly in a longitudinal groove 59 on the other side of canister 10". However, groove 59 and fuse 57 terminate approximately at the location of plate 55 at the hinged end of fingers 71. When pyrotechnic fuse 56 reaches the lower end of groove 58, it continues around the circumference of canister 10" in a circular groove 61 at right angles to the longitudinal axis of canister 10". Groove 61 is formed in the ends of fingers 71 having a U-shaped profile. The top of payload compartment 54 is configured to conform with the ends of fingers 71 such that lead encased pyrotechnic fuse 56 retains fingers 71 and causes them to engage an upper lip 62 (FIG. 10) on payload container 54. A plurality of leaf spring members 64 are secured at the center of plate 55 by a rivet 65. Each leaf spring member 64 contacts a respective finger 71 beyond its hinge point 63 urging finger 71 outwardly to the position indicated by dashed lines 71'.

Following ejection, fuses 56 and 57 when ignited burn at approximately the same rate down to the location of plate 55 allowing split half rings 41 and 42 to separate and the parachute stored in area 39 to be deployed. The parachute lines are attached in a suitable manner to plate 44. Fuse 56 continues to burn downward and then transversely around fingers 71 in grooves 58 and 61 respectively while the parachute decelerates the payload. The portion of fuse 56 which lies in circular groove 61 should be of a quick burning material so that ignition will allow all of the fingers 71 to release simultaneously. Instead of a continuous fuse in groove 61 a straight band of spring material may encircle the ends of fingers 71 with the ends of the band tied together by a portion of fuse 56 to allow more simultaneous release of fingers 71.

Figure 10:
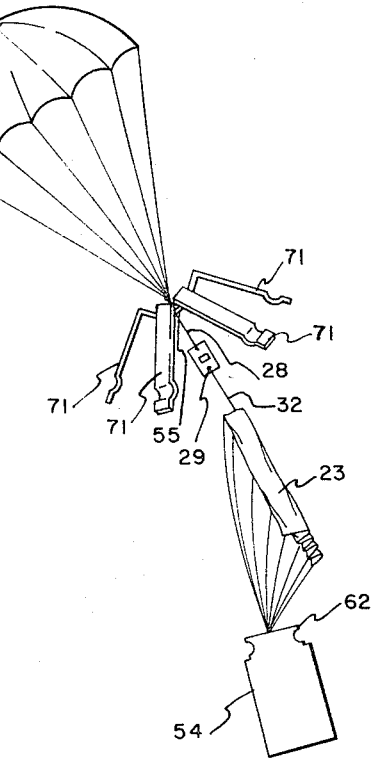
FIG. 10 is a perspective view illustrating an intermediate stage of deployment of the embodiment of FIG. 8.

FIG. 10 represents the system configuration for canister 10" immediately following the burning of fuse 56 in groove 61 and the resultant release of fingers 71. A parawing 23, formally packed in the volume enclosed by fingers 21, is shown in the stage of deployment corresponding to that in stage d of FIG. 4 for canister 10. Parawing 23 may be packed in the same manner using loose line 32 and retraction tab 29 as shown in FIG. 2a–2d. Tab 29 is connected to plate 55 via string 28. Parawing lines 46 are attached to the top of payload container 54. FIG. 10 illustrates the central difference between the embodiments of FIG. 8 and FIGS. 1 and 5; namely, that the configuration of the final descent system omits fingers 71 resulting in a weight reduction allowing a slower final descent or alternatively a smaller parawing for the same vertical descent velocity.

Although a parachute and parawing are shown for the initial and final descent stages respectively, the inventive canister and its several embodiments may be used in multistage descent systems employing other types of aerodynamic decelerators. The timing mechanisms described herein are only intended to be illustrative of the general requirement for a means of retaining the ends of resilient fingers 21 or 71 for a preselected time period following deployment of an initial aerodynamic decelerator. In addition, ejection from the aircraft may be by other suitable means than dispensing tube 11 and its associated parts. The sole purpose of dispensing tube 11 is to provide an external automatic means of separating canister 10 from the aircraft in a safe manner.

In launching small payloads from a high speed aircraft at low altitude, the inventive descent system provides a compact inexpensive means of achieving extremely slow descent velocities with aerodynamic decelerators. Because not only the initial aerodynamic decelerator, but also the compartment it was stored in, as well as the timer mechanism, are jettisoned prior to the final descent mode, the weight of the system in its final configuration is greatly reduced. By employing an initial decelerator stage, the mechanical stress on the final decelerator is lowered enabling the use of more lightweight and less bulky materials. In one embodiment, even the compartment for the final stage decelerator is detached resulting in a further reduction in weight. The disclosed two-stage system also results in optimum utilization of space and weight which is always a critical factor in airborne equipment. In applications where the overall length of the canister store is critical the invention allows maximum space for a payload. In addition, since the system has few mechanical parts, the failure rate is extremely low.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A relatively small deployment canister for a descent retarding system and capable of being carried in numbers by high speed aircraft, comprising;
   a payload compartment;
   a first aerodynamic decelerator means storage tube joined at one end to said payload compartment having a radially expandably urged opening at the other end;

removable retaining means for radially constraining the other end of said tube to maintain said opening at approximately the same width as the one end of said tube, said retaining means including a plate having a rim portion and a body portion with an elongated slot, said rim portion engaging the constrained ends of said sections, said retaining means plate body portion having a bore formed therein under the path of said key member, extractable pin means received in said retaining means plate bore for blocking said key member, said pin means being adapted to be operatively connected to a second aerodynamic decelerator means storable in said removable storage compartment, said removable storage compartment including a split ring mounted on top of said retaining means to form a cylindrical enclosure axially aligned with said housing and a removable cover plate closing the open end of said removable storage compartment, said tube being formed by a plurality of finger-like sections tubularly arranged in parallel about an axis and radially outwardly urged in relation thereto, said sections being attached at one end to said payload compartment, said retaining means constraining the other ends of said sections, the constrained ends of said finger-like sections having an inwardly bent portion such that the corresponding end of said tube is narrowed, said canister comprising;

delay means connected to said retaining means for preventing removal thereof during a predetermined time period, said delay means including a timer body disposed in the narrowed end of said tube and retained thereby, means in said timer body for producing rotation in a plane perpendicular to said axis, and a rotatable shaft connected to said rotation producing means and extending out of said timer body and through said slot in said retaining means plate, said shaft having a transverse key member registrable with said slot and normally holding said retaining means plate in fixed relation to said timer body, said timer body having an outer contour conforming with the inner contour of the other ends of said finger-like sections; and said canister further comprising;

a removable second aerodynamic decelerator means storage compartment connected to said retaining means.

2. A deployment canister according to claim 1 further comprising:

said retaining means including transverse loops attached to the constrained ends of said finger-like sections and extending inwardly, a first section of pyrotechnic fuse connected to said loops for joining said loops together thereby constraining said sections; and said delay means including a second section of pyrotechnic fuse connected to said first fuse section and terminating in an external ignition point.

3. A relatively small air dropped deployment canister for a progressively deployed multi-storage aerodynamic decelerator system, said canister capable of being carried in numbers by high speed aircraft and comprising:

a payload compartment;

a plurality of elongated fingers adjacently arranged in parallel about an axis to form a first decelerator means storage tube when constrained and a flared opening when relaxed;

plate means for connecting respective one ends of said fingers;

removable retaining means for selectively constraining and securing the other ends of said fingers to said payload compartment;

a pair of half rings mounted on said plate means to form a cylindrical second decelerator means storage compartment axially aligned with said tube;

a removable cover plate enclosing the open end of said storage compartment;

delay means connected to said retaining means for preventing removal thereof during a predetermined time period;

an ignition pad located on said cover plate;

a first sheath containing a pyrotechnic fuse extending outwardly from said pad and longitudinally along one of said half rings and one of said fingers and terminating at the other end of said one finger, said first sheath being bonded along its length to said one half ring and said one finger;

a second sheath containing a pyrotechnic fuse extending outwardly along the other said half ring, said second sheath being bonded along its length to said other half ring;

a cord circled about the other ends of said fingers, at least a portion of said cord being a pyrotechnic fuse positioned to be ignited by said first sheath fuse;

the other end of each said second finger having a U-shaped profile forming on the outside a groove receiving said cord and on the inside a rim; and the end of said payload compartment adjacent to said fingers having a groove encircling the periphery thereof and engaging said finger rims.

4. A relatively small controlled descent system canister unit for an air dropped store, said unit being capable of being carried in numbers by a high speed aircraft and comprising:

a cylindrical housing having a payload compartment at one end, a first decelerator means compartment at the other end and a second decelerator means compartment between said payload and first compartment, the portion of said housing enclosing said second compartment being formed by a plurality of outwardly urged longitudinal fingers adjacently arranged about an axis parallel to said fingers and attached at one end to a fist adjacent portion of said housing so as to enclose said second compartment, and removable retaining means for securing the other ends of said fingers to a second adjacent portion of said housing to form said second compartment;

an initial aerodynamic decelerator means packed in said first compartment having lines operatively connected to said second compartment; and a final aerodynamic decelerator means stored in said second compartment having lines operatively connected to said payload compartment.

5. A descent system unit according to claim 4 in which:

said final decelerator means comprises a parawing accordion-folded in the longitudinal direction with respect to the parawing axis and accordion-folded in the transverse direction, said parawing having a projection on the forward end thereof; and said unit further comprising; extraction means operatively connected to said parachute including a retraction tab having a means for removably engaging said projection and a line connected to said retraction tab interfolded with said parawing.

* * * * *